(12) United States Patent
Aronstam (10) Patent No.: US 6,747,914 B2
(45) Date of Patent: Jun. 8, 2004

(54) USE OF MINOR BOREHOLE OBSTRUCTIONS AS SEISMIC SOURCES

(75) Inventor: Peter S. Aronstam, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 10/213,340

(22) Filed: Aug. 6, 2002

(65) Prior Publication Data

US 2003/0026166 A1 Feb. 6, 2003

Related U.S. Application Data (63) Continuation-in-part of application No. 09/620,824, filed on Jul. 21, 2000, now Pat. No. 6,456,566.

(51) Int. Cl.[7] .............................. G01V 1/42; G01V 1/40
(52) U.S. Cl. ............................ 367/31; 367/25; 367/40; 367/57; 175/1; 175/40; 175/50; 166/249; 166/254.2; 166/250.16; 181/102; 181/104; 181/106
(58) Field of Search ...................... 367/25, 31, 40, 367/56, 57; 175/1, 40, 50; 166/249, 254.2, 256.16; 181/104, 106

(56) References Cited

U.S. PATENT DOCUMENTS

| | | | |
|---|---|---|---|
| 3,190,388 A | * 6/1965 | Moser et al. ............... 181/106 |
| 4,671,379 A | 6/1987 | Kennedy et al. ............ 181/106 |
| 4,993,001 A | 2/1991 | Winbow et al. ............ 367/144 |
| 5,170,018 A | 12/1992 | Potier ........................ 181/101 |
| 5,268,537 A | 12/1993 | Winbow et al. ............ 181/106 |
| 5,371,330 A | 12/1994 | Winbow ..................... 181/106 |
| 5,418,335 A | * 5/1995 | Winbow et al. ............ 181/106 |
| 5,646,379 A | 7/1997 | Hsu et al. ................... 181/101 |
| 5,721,538 A | * 2/1998 | Tubel et al. ............. 340/853.4 |
| 5,852,587 A | * 12/1998 | Kostek et al. ................ 367/25 |
| 5,941,307 A | * 8/1999 | Tubel ......................... 166/313 |
| 6,012,521 A | 1/2000 | Zunkel et al. .............. 166/249 |
| 6,065,538 A | 5/2000 | Reimers et al. ........ 166/250.01 |
| 6,089,345 A | * 7/2000 | Meynier et al. ............ 181/102 |
| 6,196,350 B1 | * 3/2001 | Minto ......................... 181/106 |
| 6,244,375 B1 | * 6/2001 | Norris et al. ............... 181/102 |
| 6,456,566 B1 | * 9/2002 | Aronstam .................... 367/86 |

* cited by examiner

*Primary Examiner*—Nelson Moskowitz
(74) *Attorney, Agent, or Firm*—Madan, Mossman & Sriram, P.C.

(57) ABSTRACT

An acoustic system and method for monitoring a hydrocarbon reservoir. Wellbore tube wave energy may be created by natural or ambient sources or tube waves may be excited intentionally. Wellbore tube wave energy is converted to seismic body wave energy at minor borehole obstructions or irregularities. Each obstruction or discontinuity position along the borehole has an associated unique waveform source coda that may be measured for processing the body waves radiated into the earth formation surrounding the well bore. A plurality of sensors detects the radiated seismic energy after the seismic body wave energy has transited intervening earth formations. The system may be employed for permanent monitoring of mineral resources and resource management. Measurements of reservoir characteristics may be acquired at many different times over the productive life of a reservoir. A time-lapse profile may be created that is representative of the temporal and areal changes in the petrophysical characteristics and mineral content or distribution of the intervening earth formation.

41 Claims, 7 Drawing Sheets

USE OF MINOR BOREHOLE OBSTRUCTIONS AS SEISMIC SOURCES

CROSS REFERENCE TO RELATED APPLICATIONS

This patent application is a continuation in part of U.S. patent application Ser. No. 09/620,824 filed on Jul. 21, 2000 entitled "Use of Minor Borehole Obstructions as Seismic Sources" now U.S. Pat. No. 6,456,566 to Aronstam.

FIELD OF THE INVENTION

The invention relates to the downhole generation and recording of seismic waves for use in investigation and monitoring of earth formation reservoir characteristics surrounding a well borehole. In particular, the invention relates to a method and system for monitoring seismic energy radiated from well boreholes into surrounding earth formations. The seismic body waves radiated into the surrounding earth formation, which may be converted from borehole tube waves, are used for cross well type projects and reverse VSP type projects to investigate and monitor hydrocarbon or other mineral deposits over the productive lifetime of a producing reservoir.

BACKGROUND OF THE INVENTION

This is a system for monitoring the distribution of the contents of a subsurface mineral deposit over its economic life span for long-term resource management. The system employs acoustic waves generated when borehole tube waves impinge upon minor borehole obstructions. Time varying changes of selected attributes of those acoustic waves that have transited the deposit between boreholes, may be indicative of the temporal changes in the mineral content.

Geophysical surveys are used to discover earth structure, mineral deposits, and the subsurface extent of mineral deposits such as oil, natural gas, water, sulphur, etc. Geophysical methods may also be used to monitor changes in the deposit, such as depletion resulting from production of the mineral over the economic lifetime of the deposit. The usefulness of a geophysical study depends on the ability to quantitatively measure and evaluate some geophysical analogue of petrophysical parameters related to the presence of the mineral under consideration.

Seismic methods may be applied to production-management monitoring as well as to exploration of hydrocarbon reservoirs. As is well known to geophysicists, an acoustic source at or near the surface of the earth is caused periodically to inject an acoustic wavefield into the earth at each of a plurality of source survey stations. The wavefield radiates in all directions to insonify the subsurface earth formations. The radiated wavefield energy is reflected back to be detected by seismic sensors (receivers) located at designated stations also usually located at or near the surface of the earth, but which may also be in the subsurface, for example, in well boreholes (herein, also called wellbores). The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing.

The travel-time lapse between the emission of a wavefield by a source and the reception of the resulting sequence of reflected wavefields by a receiver is a measure of the depths of the respective earth formations from which the wavefield was reflected. The relative amplitudes of the reflected wavefields may be a function (an analogue) of the density and porosity of the respective earth formations from which the wavefields were reflected as well as the formations through which the wavefields propagated. The phase angle and frequency content of returned signals in the reflected wavefields may be influenced by formation fluids, the sought-for minerals or other formation characteristics.

The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey at intervals, such as 25 meters, may be formatted side by side to form a two dimensional (2-D) analog model of a cross section of the earth. Seismic sections from a plurality of intersecting lines of survey distributed over an area of interest provide three-dimensional (3-D) imaging. A series of 3-D surveys of the same region made at successive time intervals, such as every six months, would constitute a 4-D, time-lapse study of the subsurface that would be useful to monitor, for example, the fluid-depletion rate of hydrocarbon reservoir.

The term "signature" as used herein, means the variations in amplitude, frequency and phase of an acoustic waveform (for example, a Ricker wavelet) expressed in the time domain as displayed on a time scale recording. As used herein the term "coda" means the acoustic body wave seismic energy imparted to the adjacent earth formation at a particular location. The coda associated with a particular seismic energy source point or minor well bore obstruction in this invention will be the seismic signature for that seismic energy source point. The term "minor borehole obstruction" or "borehole discontinuity" or "discontinuity" means an irregularity of any shape or character in the borehole such that tube wave energy transiting the well borehole will impart some energy to the irregularity in the borehole and thus radiate body wave energy into the surrounding earth formation while continuing to also transmit and reflect some the tube wave energy along the borehole. The term "impulse response" means the response of the instrumentation (seismic sensors and signal processing equipment) to a spike-like Dirac function or impulse. The signal energy of an acoustic wavefield received by seismic sensors depends upon the texture of the rock layers through which the wavefield propagated, from which it was reflected or with which it is otherwise associated, whether along vertical or along lateral trajectories. The term "texture" includes petrophysical parameters such as rock type, composition, porosity, permeability, density, fluid content, fluid type and intergranular cementation by way of example but not by way of limitation.

From the above considerations, it is reasonable to expect that time-lapse seismic monitoring, that is, the act of monitoring the time-varying characteristics of seismic data associated with a mineral deposit such as a hydrocarbon reservoir of oil or gas over a long period of time, would allow monitoring the depletion of the fluid or mineral content, or the mapping of time-varying attributes such the advance of a thermal front in a steam-flooding operation.

Successful time-lapse monitoring requires that differences among the processed data sets must be attributable to physical changes in the petrophysical characteristics of the deposit. This criterion is severe because changes in the data-acquisition equipment and changes in the processing algorithms, inevitable over many years may introduce differences among the separate, individual data sets from surveys that are due to instrumentation, not the result of dynamic reservoir changes.

In particular, using conventional surface exploration techniques, long-term environmental changes in field conditions such as weather and culture may affect the outcome. If time-lapse tomography or seismic monitoring is to be useful for quantitative hydrocarbon reservoir monitoring, instrumentation and environmental influences that are not due to changes in reservoir characteristics must be transparent to the before and after seismic data sets. Successful time-lapse tomography requires careful preliminary planning.

One way to avoid many time-dependent environmental changes and updated state-of-the-art instrumental changes is to permanently install seismic sources and seismic detectors in one or more boreholes in and around the area of economic interest. Identical processing methods are applied to the data throughout the monitoring period using cross-well (crossborehole) tomography rather than conventional surface type operations. One such method is disclosed in U.S. Pat. No. 5,886,255, filed Oct. 14, 1997 and assigned to the assignee of this invention and which is incorporated herein by reference as a teaching of cross-well tomography.

U.S. Pat. No. 5,406,530, issued Apr. 11, 1995 to Tokuo Yamamoto, teaches a non-destructive method of measuring physical characteristics of sediments to obtain a cross sectional distribution of porosity and permeability values and variations and of shear modulus and shear strength. A pair of boreholes has borehole entries spaced apart from each other at a predetermined distance and a plurality of hydrophones is spaced at predetermined known locations. A pseudo random binary sequence code generator as a source of seismic energy is place in another borehole and activated to transmit pseudo random wave energy from the source to the hydrophones. Seismic wave characteristics are measured in a multiplicity of paths emanating from the source to the hydrophones using cross-well tomography.

The Yamamoto teaching is primarily directed to use in shallow boreholes for engineering studies. Such holes are less than 100 meters deep, as opposed to oil-field boreholes, which may be two to five kilometers deep. The requirement for an active source to be placed at various levels in the borehole is problematic because the source can damage the hole and interfere with production. Since the seismic equipment must be moved up and down the boreholes, it is impossible to maintain identical recording conditions over an extended time period.

G. W. Winbow in U.S. Pat. No. 4,993,001 issued Feb. 12, 1991, describes a method and apparatus for converting tube waves into downhole body waves for seismic exploration. The equipment comprises a rotary-valve tube wave source for producing swept-frequency tube waves that are injected into tubing or well bore fluid. The tube waves are converted into body waves by an elongate tube wave converter located at a selected position downhole. The tube wave converter comprises an elongate body that preferably substantially fills the well bore or tubing and has a preferred shape in order to convert efficiently the tube waves to body waves at the selected position downhole. This patent is directed primarily to reverse VSP. Winbow acknowledges that it is well known in the art that "nonuniformities in the borehole" cause seismic-wave mode conversions that cause secondary acoustic radiation and associated multiples.

Winbow employs a single tube-wave converter to serve as a single source of direct and reflected seismic waves but he must repeatedly reposition the device at spaced-apart intervals down the length of the borehole to get extended vertical coverage as in cross-well tomography. That system thus is difficult to implement for the fixed permanent instrumental installation required for 4-D seismic monitoring operation.

There is a need for a system of seismic sources fixed permanently in boreholes that may be used for monitoring time-varying reservoir attributes such as the distribution of the contents of a mineral deposit. Additionally, there is a need for a system that not only would be used with intentionally generated seismic energy, but could also take advantage of naturally occurring or ambient energy in boreholes, energy that creates tube waves that may be converted to seismic body waves radiated into earth formations around boreholes.

SUMMARY OF THE INVENTION

The present invention is a method of monitoring a hydrocarbon reservoir within an earth formation. Signals indicative of a parameter of interest of hydrocarbon reservoirs are detected using a plurality of seismic detectors. Seismic body waves radiate from a plurality of spaced apart discontinuities in a borehole and traverse earth formations. The signals traversing the earth formations and hydrocarbon reservoirs are detected to provide signals indicative of a parameter of interest at more than one time. These signals are used to determine a change in the hydrocarbon reservoir by comparing signals indicative of a parameter of interest of the hydrocarbon reservoir with signals indicative of a parameter of interest of the hydrocarbon reservoir detected at the later time.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

For the purpose of clarity and explanation, the method of this invention will be described by way of example, but not by way of limitation, with respect to cross-well tomography with receivers in boreholes as well as the earth surface. It is to be clearly understood that the method may be applied to any multichannel data recording geometry or acquisition regime whether seismic sensors are in the subsurface, in well bores, or at or near the surface of the earth. Additionally, when the terms "borehole obstruction" or "borehole discontinuity" are used, they refer to any shape or character of location in a borehole where tube wave energy is reflected, transmitted or converted to body wave energy. Examples of minor borehole obstructions are change in the diameter of the well casing or coiled tubing, a non-uniform part of the casing or tubing that changes the casing or tubing continuity, a packer or any other change in the continuity of the borehole.

Borehole tube waves occur in the fluid column of well bores. The energy source that excites tube waves may be naturally occurring or intentionally generated by any known method. This invention may be practiced using tube waves generated entirely by naturally occurring or ambient energy sources, as would be the case in a completely passive system of recording. This invention may be practiced using tube waves generated by an acoustic driver, which is a seismic source of any known type intentionally exciting borehole tube waves. The invention may be practiced using a combination of passive and active borehole tube wave energy source methods.

The tube wave energy transits along the fluid column. Part of the tube wave energy will be converted to body waves at well bore discontinuities of any type, for instance, a change in the character of borehole tubulars such as a well borehole packer. Body waves travel through earth formations and may be received at seismic receivers.

Changes in the hydrocarbon reservoir over the production life of the reservoir may be detected by changes in a parameter of interest as indicated by temporal changes in seismic body wave characteristics or attributes. The parameter of interest may be any seismic attribute, individually or in combination, of detected seismic body waves which have traversed the reservoir. Seismic attributes are well known in the art. Some examples of attributes are seismic impedance, amplitude, attenuation, frequency, phase, polarity, velocity, dip, azimuth, envelope, etc.

Figure 1A:
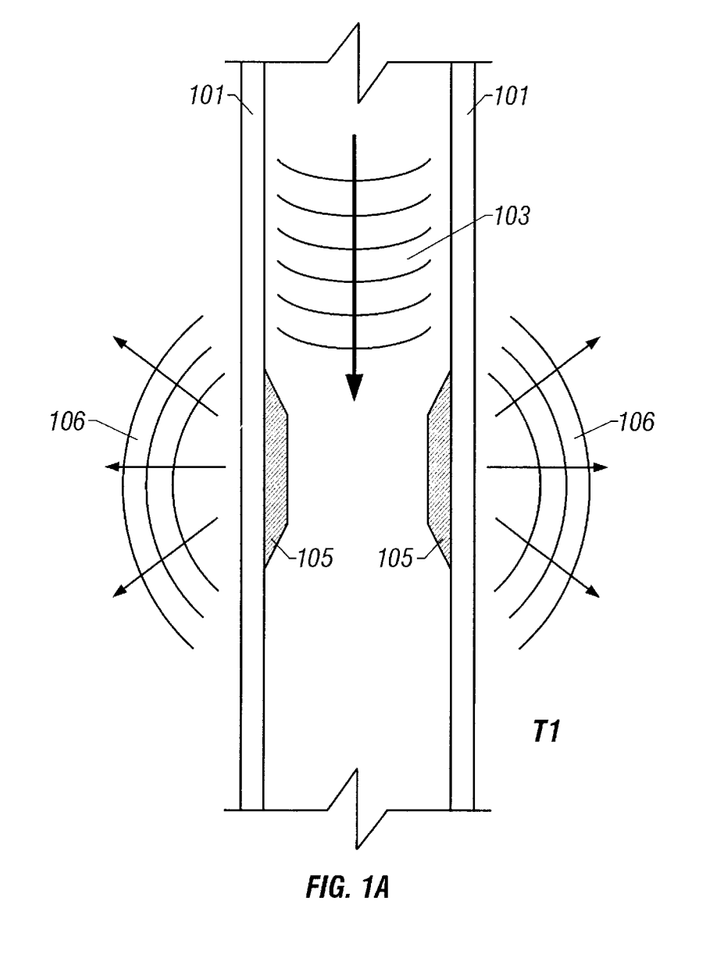
FIG. 1 is a step-by-step diagram of tube wave propagation impinging on a discontinuity or minor borehole obstruction to become a body wave.
Figure 1B:
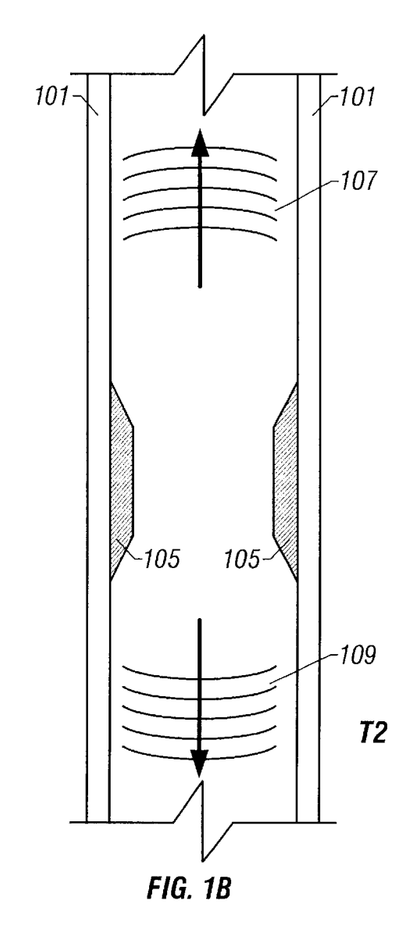

The conversion of tube wave energy to body waves as tube wave energy transits axially in a well bore is illustrated in FIG. 1A. Tube wave energy 103 transits directionally along a well bore 101 as shown in cross-section in FIG. 1A. As the tube wave energy 103 impinges on a discontinuity or minor borehole obstruction 105 of any type, some of the energy is imparted to the discontinuity at an arbitrary time T1. Some tube wave energy will be radiated out of the borehole and into the surrounding earth formation as body wave energy 106 at the location in the borehole where the borehole discontinuity 105 is present. Additionally, as shown in FIG. 1B at arbitrary time T2, some energy will be reflected back in the opposite direction the tube wave energy has just transited 107. Part of the energy 109 will also be transmitted and so continue transiting along the well bore along the same direction as before the tube wave energy impinged on the obstruction.

Tube wave energy may propagate in well bore fluid in open boreholes, casing and production or coiled tubing inside well casing. Discontinuities may be intentionally placed in boreholes, casing and tubing. Discontinuities, perhaps with proximately associated acoustic sensors, may be intentionally placed in casing or tubing to create a source tubing, where the spacing and knowledge of the coda produced may be easily monitored.

Figure 2:
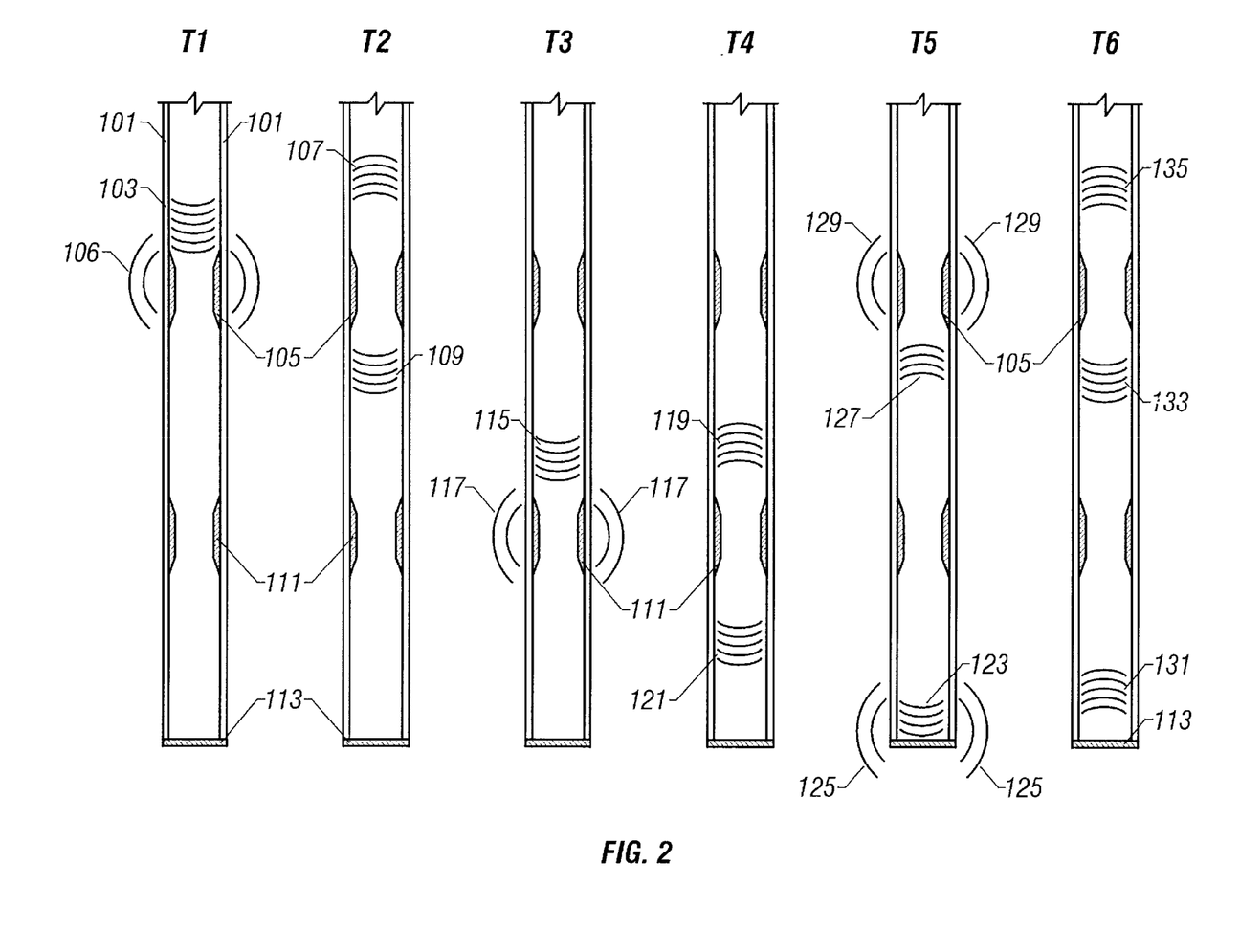
FIG. 2 is a time-lapse sequence as tube wave energy reverberation impinges on two minor borehole obstructions and the well bottom hole to create source signatures at the discontinuity locations.

FIG. 2 is a schematic time lapse sequence of tube wave energy reverberating in a well bore 101 with two borehole discontinuities or minor borehole obstructions and the well bore bottom converting tube waves to body waves. Body waves will be radiated into the surrounding earth formation at each location an obstruction exists in a well bore. Body waves radiating from each obstruction location will produce a unique source signature or coda over time. The coda are related to a velocity of propagation of the tube wave in the borehole and a distance between a discontinuity and at least one other of the plurality of spaced apart discontinuities/obstructions. In FIG. 2, there are three locations that will produce unique coda, the upper discontinuity 105, the lower discontinuity 111, and the bottom of the well bore 113.

In FIG. 2 at arbitrary time T1 tube wave energy 103 impinges on the upper discontinuity 105 and body wave energy 106 emanates from the well bore. At time T2 the tube wave energy reverberates up 107 and down 109 along the well bore away from the upper discontinuity. At time T3 the downgoing tube wave reverberation energy 115 impinges on the lower discontinuity 111 and part of the energy is converted to body wave energy 117 radiating into the surrounding earth formation. At time T4 the tube wave energy reverberates up 119 and down 121 along the well bore from the lower discontinuity 111. At time T5 the downgoing tube wave energy 123 impinges on the bottom of the well bore 113 where part of the energy is converted to body wave energy 125. The upgoing energy 127 impinges on the upper obstruction 105 where some of the energy is converted to body waves 129. At time T6 tube wave energy 131 is reflected or diffracted off of the well bore bottom 113 and moves up the well bore fluid column. Also at T6 energy has likewise been separated into downgoing energy 133 and upgoing energy 135 by discontinuity 105.

Each discontinuity produces its own source signal coda based on the time body waves emanate from the well bore at each discontinuity or bottom hole location. For instance, the coda produced at discontinuity 105 in FIG. 2 contains body wave energy produced at arbitrary time steps T1 and T5. The coda produced at discontinuity 111 will contain body wave energy transmitted at arbitrary time step T3. The coda generated by body waves transmitted from the bottom of the well bore 113 will contain energy at time step T5. These coda, or source signature patterns, are deconvolved, for example using cross correlation, with the received acoustic wavefield to form an image of the subsurface as is well known in the art, and to determine parameters of interest in the earth formation the body wave energy has transited through.

Figure 3:
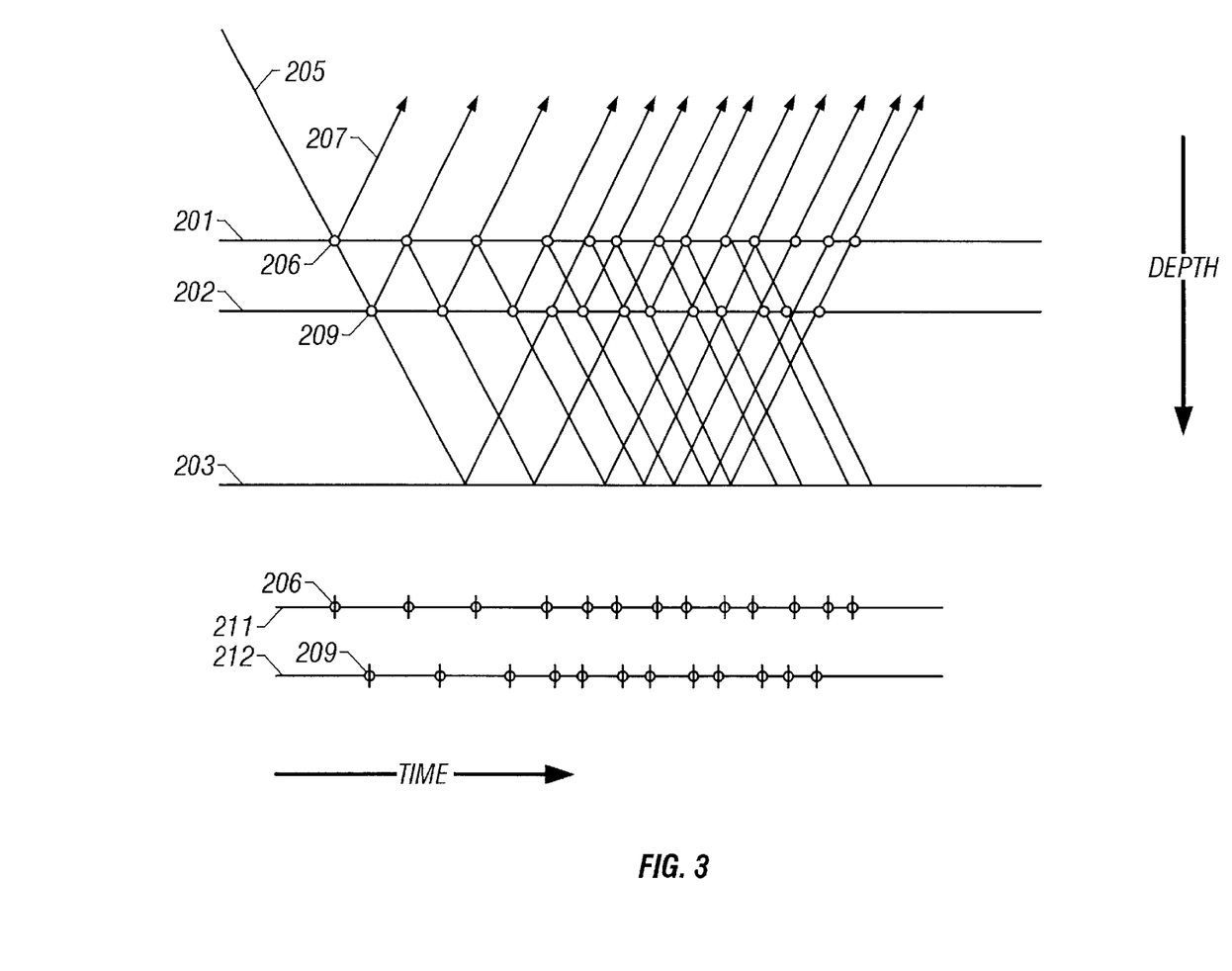
FIG. 3 is a schematic simulation of a tube wave creating codas or source signatures.

FIG. 3 is a schematic tube wave simulation demonstrating how waveform coda are produced over time. Each discontinuity will have a unique waveform coda that will be the source signature for the seismic energy emanating into the surrounding earth from that discontinuity location. FIG. 3 contains two discontinuities and a bottom hole. The discontinuities shown vertically in depth are labeled in 201, 202 and the bottom hole is 203. The horizontal axis represents time. A tube wave 205 travels down to discontinuity 201 where some of the energy is converted to body waves at the point in time represented by the dot 206. At 206 the energy not converted into body wave energy splits into upgoing tube wave energy 207 and downgoing tube wave energy which travels to the first dot 209 on the next lower discontinuity 202. At 209 some energy is converted to body wave energy imparted to the surrounding formation, other energy remains as tube wave energy, some traveling up to the discontinuity 201 and other energy going toward the bottom hole 203.

Codas for discontinuity 201 and 202 are shown, and the bottom hole 203 is included to show how reverberation from other discontinuities influence coda generation. The coda for discontinuity 201 is shown below the simulation model at 211. Dot 206, the first body wave conversion is shown, followed in time by all the other body wave generation time points. The vertical bars through the dots of coda 211 represent the time body waves are generated at the discontinuity 201. The coda for discontinuity 202 is represented by 212, again with 209 representing the first body wave conversion from tube wave energy occurring for discontinuity 202. The codas are unique to each discontinuity, although each coda is affected by the output of every other discontinuity in the borehole. The coda for body wave energy converted at the well bottom 203 is not shown.

In FIG. 3 the initial tube wave 205 may be generated by naturally occurring or ambient energy inside of or in the area of a well bore. For instance production equipment in or associated with a well may create tube waves. The natural borehole flow of fluids or gas, for example produced fluids or gas, in a well bore may generate tube waves due to the acoustic excitation of dynamic borehole flow in a reservoir. Alternatively, tube waves may be intentionally generated using an acoustic driver for example with an impulsive source such as an airgun or with a swept or variable frequency source, and any seismic or acoustic source may be used. Tube wave energy generated intentionally by many different methods or generated by naturally occurring or incidental phenomena may be used with this invention.

Existing wells have numerous internal components which can act as tube wave converters, and because each well is effectively a semi-custom design, it is quite probable that these nodes are producing body waves with unique coda due to the inherent irregular discontinuity spacings which occurred in the well design. Once the nature of the coda emitted for a discontinuity has been determined, the associated signal and source point may be used from this node for reservoir monitoring. The nodes may be excited by inducing tube waves or may be excited by naturally occurring phenomena or locally ambient energy in or near the well-bore, for example, pressure fluctuations in the reservoir flow.

In a preferred embodiment a receiver is placed near a discontinuity to record the coda associated with the discontinuity. However, there are other methods of determining or measuring coda, and receivers are not required to directly measure the coda for every discontinuity. A transducer may be lowered in the annular space and a pilot signal directly recorded. For example, a lightweight fiber optic transducer may be used to record data while having a negligent effect on transited seismic energy.

Alternatively, beam steering of recordings of receiver surface arrays may be used to determine the location and signature of sources of noise/coda emitted at discontinuities along the well bore. Beam steering is a method of emphasizing energy from a particular direction and location by delaying successive channels so that events of a certain dip moveout (or apparent velocity) occur at the same time, and then summing them. This procedure can be repeated for a succession of different discontinuity source locations.

Figure 4:
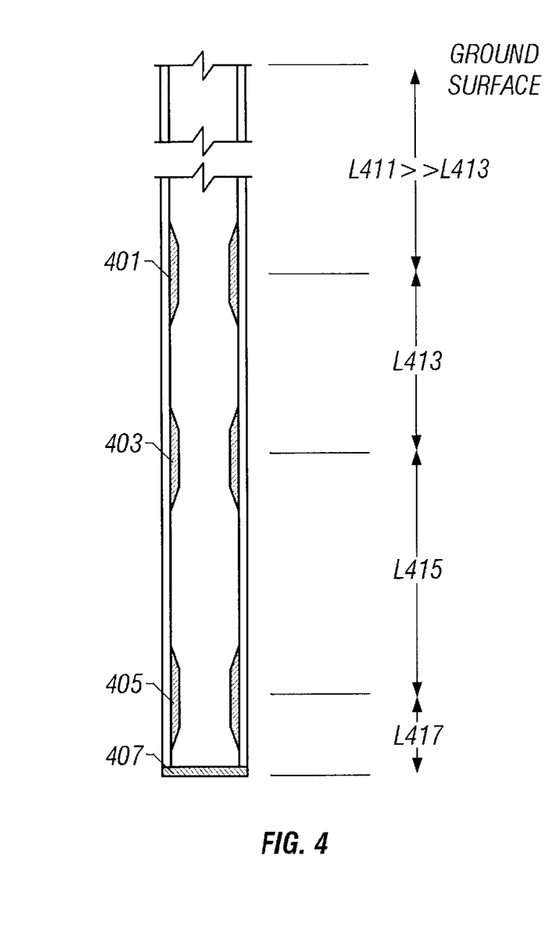
FIG. 4 is a diagram of minor borehole obstructions as they are placed in a well bore.

The discontinuities or minor borehole obstructions may be of any type found in a well bore whether placed intentionally for use with this invention or not. As shown in FIG. 4, the discontinuities may be spaced arbitrarily along the well bore. In FIG. 4, the lengths between discontinuities 401, 403, 405 and bottom hole 407 are not necessarily equal. So, in the FIG. 4 example, length $L411 \neq L413 \neq L415 \neq L417$. Closely spaced discontinuities may appear as a point source in the far field. For example the energy received by receivers from discontinuity 405 and the bottom hole 407, as shown in FIG. 4, can appear as a point source in the far field.

Figure 5:
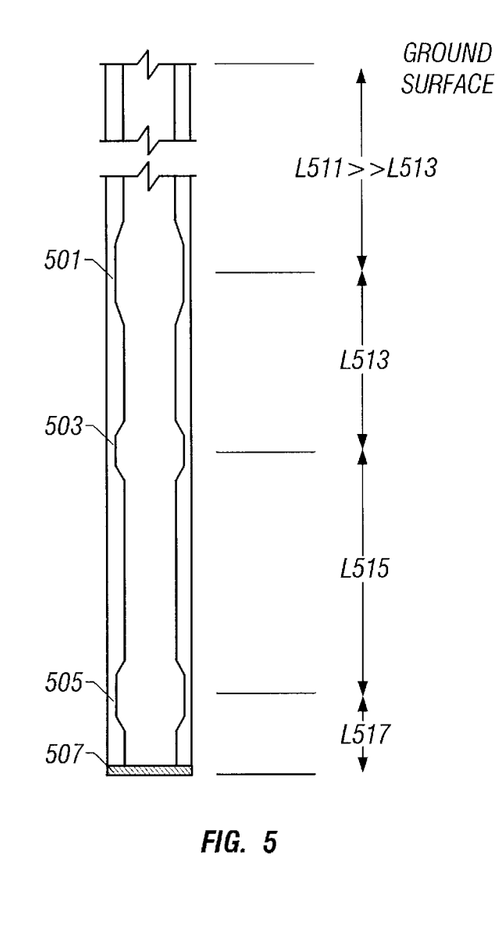
FIG. 5 is a diagram of 'enlargement' type borehole discontinuities placed in a well bore.

The discontinuities or minor borehole obstructions may be restrictions, as shown by discontinuities 401, 403 and 405 in FIG. 4, or enlargements in the well bore, as shown in FIG. 5 for discontinuities 501, 503, 505 and bottom hole 507. Again, distances between enlargements may be irregular so that, for instance, in FIG. 5, $L511 \neq L513 \neq L515 \neq L517$.

The enlargements may be arbitrarily shaped, uniformity is not required, and nonuniformity for enlargements or restriction type discontinuities may be desired to enhance the diversity of body wave signal characteristics. Any combination of arbitrarily shaped minor borehole obstructions, whether the discontinuities are enlargements, restrictions or combinations, may be used.

Figure 6:
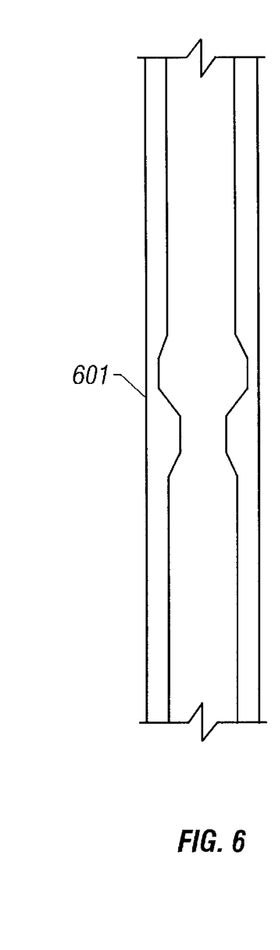
FIG. 6 is design for a complex borehole discontinuity.

Complex and arbitrary shapes, as shown by discontinuity 601 in FIG. 6, may be designed to increase the variability of the source signature as well as to change the effective bandwidth of the radiated signal. Special shapes of discontinuities may be used, for instance an inverse Venturi configuration. The distances separating the minor borehole obstructions along the well bore may be spaced equally or they may be unequal distances apart. All well bores have discontinuities or irregularities along the borehole that will diffractively transmit acoustic body wave energy converted from borehole tube waves into the earth at the discontinuity locations.

Each discontinuity is a separate point source of body wave energy and each discontinuity has a unique source coda or signature. For this example, we assume a seismic sensor for measuring the coda has been placed at or near the well bore discontinuity locations of interest, but this is not a limitation on the invention, as methods other than direct near-source measurement for detecting source signatures and deconvolution operators are known.

The earth may be imaged using the method previously discussed once the signal is known. Although the coda may be deduced, $t_0$ may be unknown for a parameter of interest under some acquisition conditions. For seismic attenuation imaging, knowing $t_0$ is unnecessary as one only needs the frequency envelope decay over time to create an image. If a time based reconstruction is sought, determination of the initial time reference may be accomplished using the cross correlation of pressure or acoustic energy measured at one wellhead or even using multiple wells. Another alternative would be, as previously explained, to permanently deploy one or more sensors in the well to determine the reference time, $t_0$.

Each discontinuity or minor borehole obstruction is an energy radiation source point with a unique waveform coda for acoustic energy radiated into the adjacent earth formation. A sensor is placed to record the waveform coda as it is generated. Each coda is then deconvolved, for example using cross correlation, with the acoustic wave field recorded away from the well bore, for instance with seismic sensors in another well bore or on the surface of the earth or the ocean floor.

Figure 7:
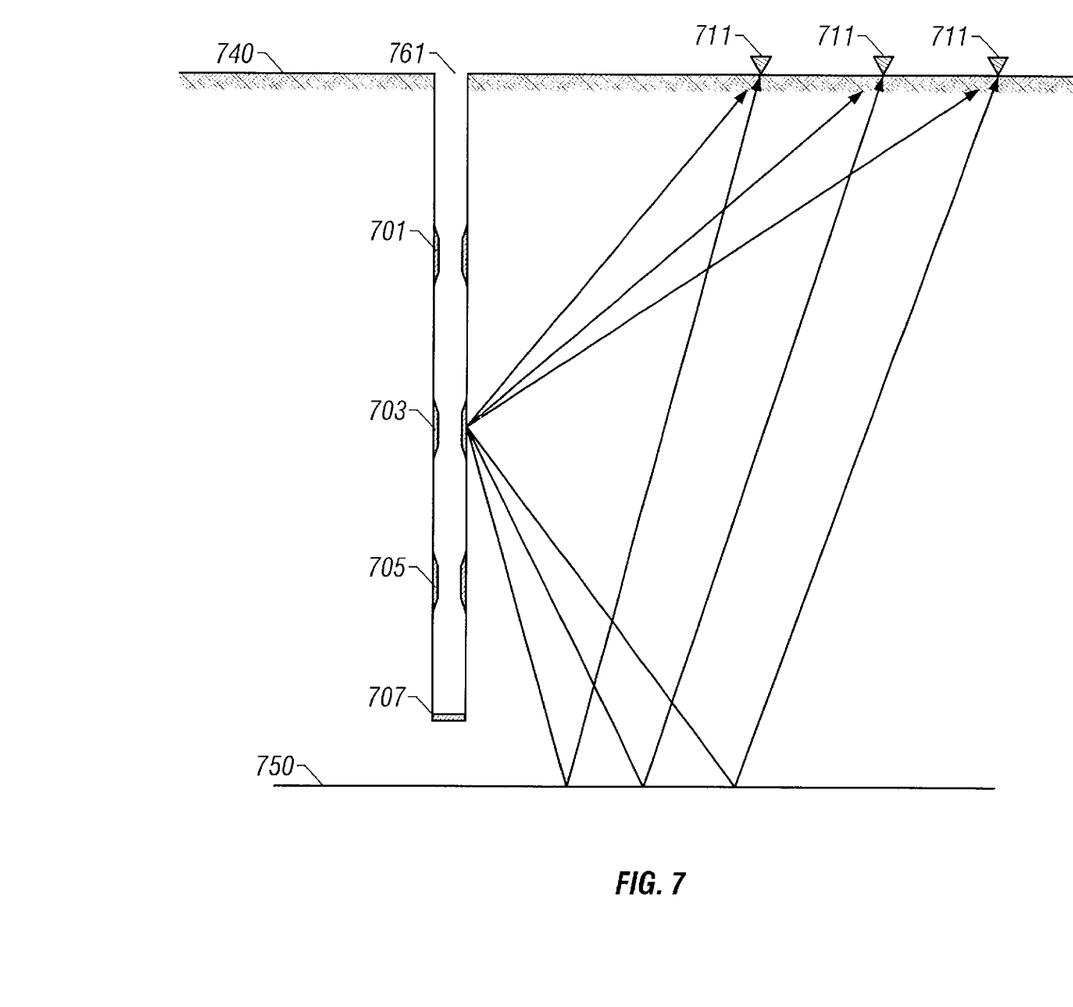
FIG. 7 is a schematic of a Reverse VSP type project utilizing the invention.

The invention may be used with a reverse VSP type project as shown schematically in FIG. 7. A well 761 has discontinuities 701, 703, 705 and well bottom 707 from which body waves may radiate into the surrounding earth formation. As shown by lines originating at discontinuity 703, body wave energy may travel directly to earth surface 740 where sensors 711 receive the energy. Body wave energy originating at, for instance, discontinuity 703 may reflect or refract off of geologic interfaces 750 in the earth. Body wave energy may emanate from any of the discontinuities, 701, 703, 705 or 707, which also may have associated sensors to directly measure the associated source waveform coda or seismic energy received from any other source point.

Figure 8:
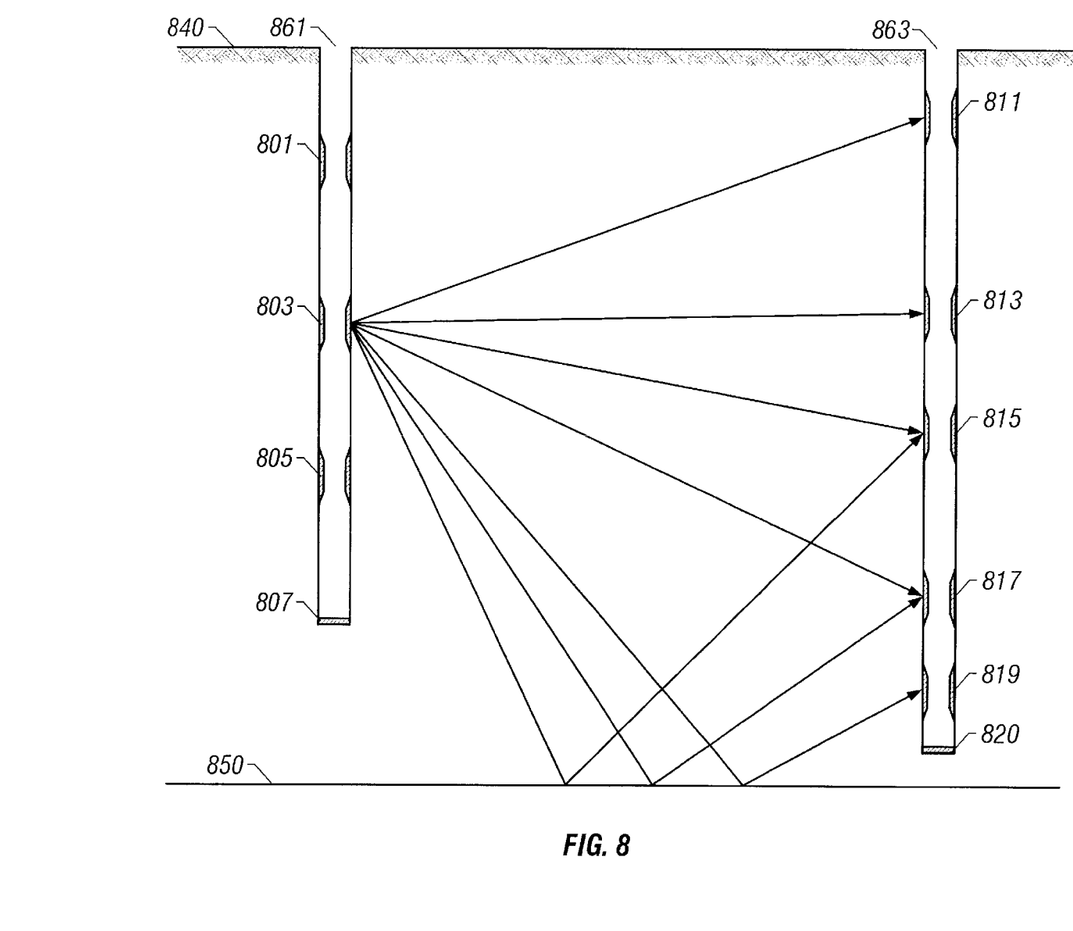
FIG. 8 is a schematic of a Cross-Well application type project utilizing the invention.

Cross-well type projects may be undertaken with this invention as shown in FIG. 8. A source well 861 will contain source point discontinuities 801, 803, 805 and 807 or combinations of discontinuities appearing as source points in the far field. Body waves will be converted from tube waves at these discontinuities. A cross-well project will have at least one receiver well 863 containing receivers or receiver with source-point discontinuity combinations 811, 813, 815, 817, 819 and 820. The lines originating at discontinuity 803 show a few possible wave paths. The body wave energy may travel directly to a receivers or receiver-discontinuity combinations 811, 813, 815 and 817 in another well 863. The body wave energy may reflect or refract off of geologic interfaces 850 in the subsurface before being received by receivers or receiver-discontinuity combinations 815, 817 and 819. As is well understood in the art, many other body wave paths traversing intervening earth formations containing useful information will be received at sensors in a cross-well type project.

Figure 9:
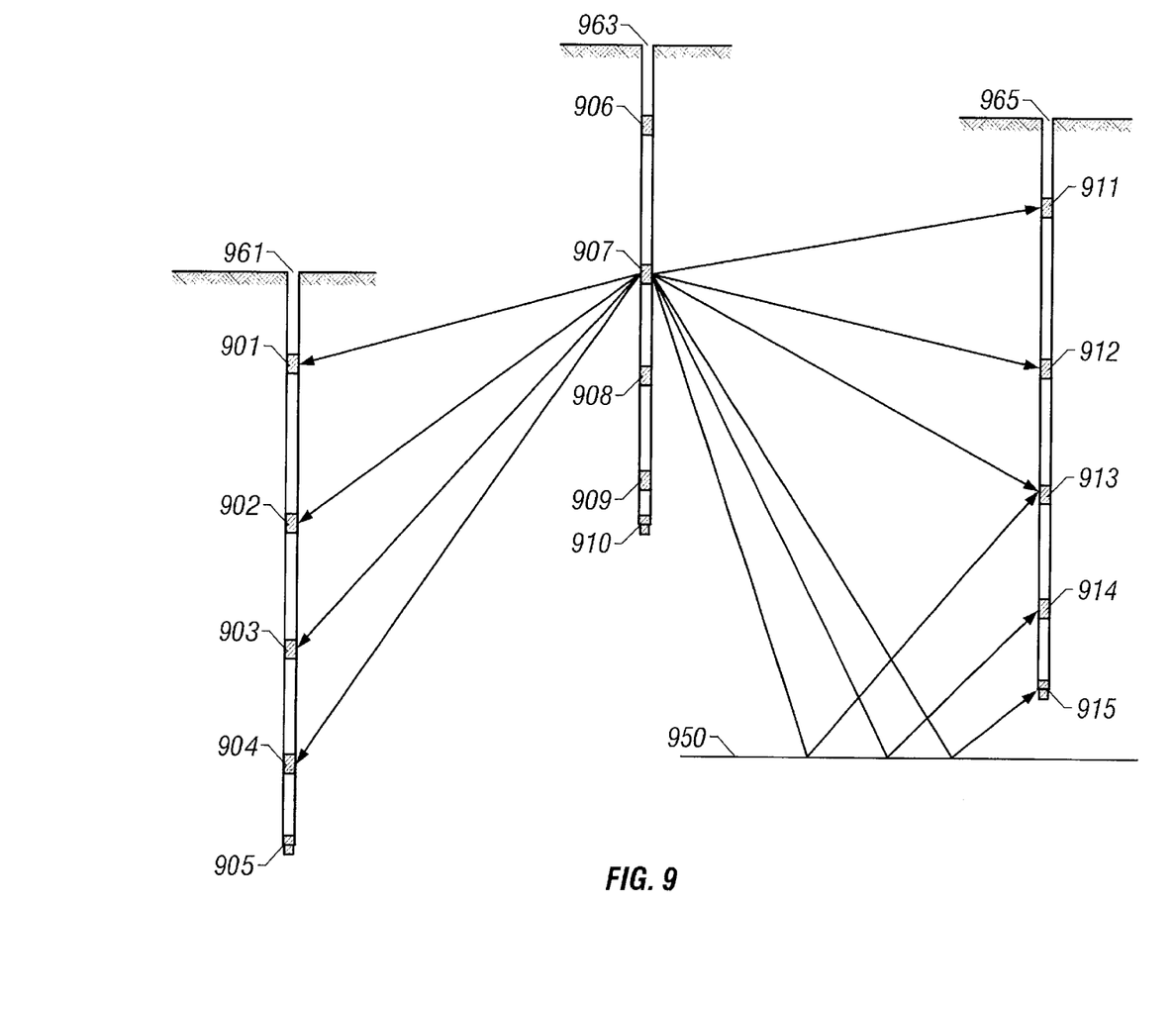
FIG. 9 is a schematic of a Multi-Well Cross-Well application type project utilizing the invention.

The cross-well project may be a multi-well project so that many boreholes may be utilized to simultaneously record body wave energy emanating from a source well 963 as shown in FIG. 9. The source well 963 will have source points 906, 907, 908, 909 and 910 for example. Receiver wells 961, 965 will contain receivers along the well bores 901 through 905, and 911 through 915 respectively. As in the FIG. 8 example, some or each of the receivers may be associated with minor borehole obstructions in the receiver wells, since the receiver wells may also be utilized as source wells. Example body wave raypaths are shown originating at source point 907. The raypaths may be direct as shown between the source well 963 and receiver well 961. The raypaths may be combinations of reflected energy off of a geologic interface 950 with direct raypaths as shown by energy emanating at source well 963 and being received by receiver well 965.

After the receivers or acoustic sensors have received the signals, signal-processing methods well known in the art may be applied to the data. These methods may use processors such as computers and algorithms known in the art, for example cross-well methods.

As the foregoing examples demonstrate, this method may be used for hydrocarbon or other mineral deposit assessment at any point in time, over several time periods, and may be utilized as an ongoing part of the management and monitoring of a producing reservoir. Time varying changes of selected attributes of acoustic waves that have transited the earth formation between boreholes are indicative of the temporal changes in the mineral content. This invention allows for constant or periodic assessment of production and resource management during the productive life of oil, gas or other mineral deposits. Hydrocarbon migration during production, hydrocarbon migration during operations such as secondary recovery, steam flood progression, water invasion into oil and gas reservoirs are all examples of reservoir processes that may be monitored over time with this invention. Analysis methods include tomographic reconstruction and mapping a position of a fluid interface within the formation.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A system for seismic data acquisition in an earth formation composing:
    (a) at least one well borehole in an earth formation, said at least one well borehole containing a column of borehole fluid;
    (b) a plurality of axially spaced apart discontinuities associated with said at least one well borehole, each of said spaced apart discontinuities radiating a seismic wavefield into the earth formation in response to propagating tube waves in the well borehole fluid, said plurality of discontinuities producing a composite wavefield in response to said propagating tube waves;
    (c) at least one detector for receiving signals indicative of said composite wavefield traversing the earth formation; and
    (d) an acoustic sensor associated with at least one of said discontinuities for providing a signal indicative of a coda of said at least one discontinuity.

2. The system of claim 1 wherein said well borehole contains at least one discontinuity in a well borehole casing.

3. The system of claim 1 wherein at least one of said discontinuities is located in an annulus between said well borehole and casing.

4. The system of claim 1 further comprising a processor for processing signals from said at least one detector.

5. The system of claim 1 wherein the processor deconvolves signals from the at least one detector with a waveform related to the signal from said acoustic sensor.

6. The system of claim 1 wherein the at least one detector comprises a plurality of detectors, and wherein the processor further uses beam steering for determining the source signature and source location of said seismic body waves associated with said axially spaced apart discontinuities in the well borehole.

7. The system of claim 1 further comprising a source tubing within said well borehole, said source tubing containing said plurality of discontinuities.

8. The system of claim 1 wherein propagating tube waves are generated by ambient background acoustic energy.

9. The system of claim 1 wherein propagating tube waves are generated by acoustic excitation created by borehole flow.

10. The system of claim 1 further comprising at least one tube wave absorber for altering propagation of said tube wave within said well borehole.

11. The system of claim 1 further comprising an acoustic driver for initiating propagation of said tube wave within said well borehole.

12. The system of claim 1 further comprising a variable frequency acoustic driver for initiating propagation of said tube wave within said well borehole.

13. A method of monitoring a hydrocarbon reservoir within an earth formation, the method comprising:
    (a) detecting signals indicative of a parameter of interest of said hydrocarbon reservoir, using a plurality of seismic detectors to record seismic body waves radiated from a plurality of spaced apart discontinuities in a borehole, said seismic body waves traversing said earth formation;

(b) repeating step (a) at a later time to provide signals indicative of a parameter of interest of said hydrocarbon reservoir at said later time; and (c) determining a change in said hydrocarbon reservoir by comparing signals indicative of a parameter of interest of said hydrocarbon reservoir with the parameter of interest of said hydrocarbon reservoir at said later time.

14. The method of claim 13 wherein at least one of said discontinuities is located on a well borehole casings.

15. The method of claim 13 wherein at least one of said discontinuities is located in an annulus between said well borehole and casing.

16. The method of claim 13 further comprising using an acoustic driver for initiating propagation of tube waves within said well borehole.

17. The method of claim 13 further comprising a variable frequency acoustic driver for initiating propagation of tube waves within said well borehole.

18. The method of claim 13 using an acoustic sensor associated with at least one of said discontinuities for providing a signal indicative of the composite seismic wavefield radiated by said at least one discontinuity.

19. The method of claim 18 further comprising deconvolving signals from the plurality of detectors with a waveform related to the signal from at least one of said acoustic sensor associated with said at least one borehole discontinuity.

20. The method of claim 13 further comprising using beam steering for determining the source signature and source location of said seismic body waves associated with said discontinuity in the well borehole.

21. The system of claim 13 wherein propagating seismic body waves are generated by ambient background acoustic energy.

22. The method of claim 13 wherein the said well borehole is a production borehole having a production tubing therein.

23. The method of claim 13 further comprising at least one tube wave absorber for altering propagation of said tube wave within said well borehole.

24. The method of claim 13 further comprising a source tubing within said well borehole, said source tubing containing said plurality of discontinuities.

25. The system of claim 1 wherein said axially spaced apart discontinuities are selected from the group consisting of (i) a change in the diameter of a well casing, (ii) a change in diameter of a coiled tubing, and (iii) a non-uniform part of a casing or tubing.

26. The system of claim 1 wherein said processor further performs an imaging of said earth formation using said received signals.

27. The system of claim 26 wherein said imaging comprises seismic attenuation imaging.

28. The system of claim 26 wherein said imaging comprises tomographic imaging.

29. The system of claim 1 wherein said system is configured for cross-well operations.

30. The system of claim 1 wherein said at least one detector comprises a fiber optic sensor.

31. The method of claim 13 wherein said parameter of interest is selected from the group consisting of (i) a seismic impedance, (ii) a seismic amplitude, (iii) a measure of seismic attenuation, (iv) a frequency of said signals, (v) a phase of said signals, (vi) a polarity of said signals, (viii) a velocity of propagation of said signals, (ix) an apparent dip of said signals, (x) an azimuth of arrival of said signals, and (xi) an envelope of said signals.

32. The method of claim 13 wherein said at plurality of seismic detectors are at a surface location, the method further comprising performing a reverse VSP.

33. The method of claim 13 wherein at least one of said plurality of seismic detectors is in a different borehole dan said spaced apart discontinuities.

34. The system of claim 1 wherein said well borehole contains at least one discontinuity in production tubing.

35. The system of claim 1 wherein said well borehole contains at least one discontinuity in coiled tubing.

36. The system of claim 1 wherein at least one of said discontinuities is located in an annulus between said well borehole and production tubing.

37. The system of claim 1 wherein at least one of said discontinuities is located in an annulus between said well borehole and coiled tubing.

38. The method of claim 13 wherein at least one of said discontinuities is located on production tubing.

39. The method of claim 13 wherein at least one of said discontinuities is located on coiled tubing.

40. The method of claim 13 wherein at least one of said discontinuities is located in an annulus between said well borehole and production tubing and coiled tubing.

41. The method of claim 13 wherein at least one of said discontinuities is located in an annulus between said well borehole and coiled tubing.

* * * * *